United States Patent
Yates

[11] Patent Number: 6,131,994
[45] Date of Patent: Oct. 17, 2000

[54] BICYCLE SADDLE

[76] Inventor: Paul M. Yates, 5814 Briar Tree Dr., LaCanada, Calif. 91011

[21] Appl. No.: 09/285,898

[22] Filed: Apr. 8, 1999

Related U.S. Application Data

[63] Continuation-in-part of application No. 08/955,897, Oct. 22, 1997, Pat. No. 5,904,396.

[51] Int. Cl.[7] .......................................................... B62J 1/18
[52] U.S. Cl. ........................................ 297/214; 297/195.1
[58] Field of Search ................................ 297/195.1, 202, 297/214, 452.41, DIG. 2, DIG. 1, 452.55, 452.48; 5/654, 655.5

[56] References Cited

U.S. PATENT DOCUMENTS

| | | |
|---|---|---|
| 2,083,060 | 6/1937 | Faulhaber . |
| 5,108,076 | 4/1992 | Chiarella . |
| 5,165,752 | 11/1992 | Terry . |
| 5,203,607 | 4/1993 | Landi . |
| 5,252,373 | 10/1993 | Ganske et al. . |
| 5,348,369 | 9/1994 | Yu . |
| 5,356,205 | 10/1994 | Calvert et al. . |
| 5,387,024 | 2/1995 | Bigolin . |
| 5,670,232 | 9/1997 | Bigolin . |

*Primary Examiner*—Milton Nelson, Jr.
*Attorney, Agent, or Firm*—Walter A. Hackler

[57] ABSTRACT

A bicycle saddle includes a shell having a horn and a seat. The fabric is disposed on the shell and sealed thereto with a flexible shoe disposed between the shell and the fabric. The flexible shoe, which may have a honeycomb construction, provides more resiliency over the horn opening than over the seat.

20 Claims, 2 Drawing Sheets

BICYCLE SADDLE

The present invention is a continuation-in-part of, U.S. Ser. No. 08/955,897, filed Oct. 22, 1997 now U.S. Pat. No. 5,904,396.

The present invention generally relates to bicycle saddles and more specifically relates to a cushioned bicycle saddle. Most modern high bicycle saddles consist of a pliable or semi-rigid molded shell with a leather, plastic, vinyl fabric cover fitted thereover. The use of lightweight, durable materials in modern saddles has resulted in a lighter, more durable and more appealing saddle than those herebefore designed.

Since a formed shell is utilized, comfort of the rider is often sacrificed. Various patents and the like have been designed for providing a cushioned ride to a rider; however, the underlying shell often provides an uncompromising surface which the rider's posterior encounters when severe vertical gyrations of the saddle occur during navigation of the bicycle, particularly over rough terrain.

The present invention provides a bicycle saddle which not only supports a rider in a cushioned manner, but also enables portions of the saddle to provide a resilient support without the "bottoming" effect as hereinabove noted.

SUMMARY OF THE INVENTION

A bicycle saddle in accordance with the present invention generally includes a bicycle saddle shell having an opening in a horn of the shell and an opening in the seat of the shell. A covering is disposed on the shell and attached thereto, with a flexible shoe disposed between the shell and the covering. Further resilient means are provided and disposed between the shell and the flexible shoe for providing more resiliency over the horn opening than over the seat opening.

More particularly, the flexible shoe may be an elastomer having a plurality of cavities therein and the resilient means may include a plurality of projections. The cavities and projections are sized and spaced apart from one another to enable engagement, or meshing together upon assembly.

Preferably, the resilient means are disposed between the shell and the flexible shoe only in the area of the saddle seat and the resilient means may comprise a foam or an elastomer.

In one embodiment of the present invention, only a horn opening is provided in the shell and the resilient means is disposed between the shell and the flexible shoe for modifying the resiliency of the saddle over the seat portion. The flexible shoe may comprise an elastomer and the resilient means may comprise a foam. Alternatively, both the flexible shoe and the resilient means may comprise an elastomer.

The cavities in the flexible shoe define the honeycomb structure which enables air passage therethrough in a portion of the flexible shoe covering the horn opening. This ventilation is important for providing a rider comfort over long durations of use.

To enhance the ventilation, perforations may be provided in the covering for enabling air passage therethrough in a portion of the covering over the horn opening.

Additionally, a plastic coating disposed on the portion of covering disposed over horn opening provides a moisture barrier as well as a decorative pattern on the saddle.

Another embodiment of the present invention includes a shell having a horn and a seat with resilient means disposed on the shell for providing cushion like resiliency. A resilient flexible shoe is disposed over the resilient means. The shoe and resilient means each has cavities and/or projections thereon which correspondingly engage one another upon alignment with one another. The projections and cavities are arranged and sized in order to provide more resiliency over the horn than over the seat of the shell.

BRIEF DESCRIPTION OF THE DRAWINGS

The advantages and features of the present invention will be better understood by the following description when considered in conjunction with the accompanying drawings, in which.

DETAILED DESCRIPTION

Figure 1:
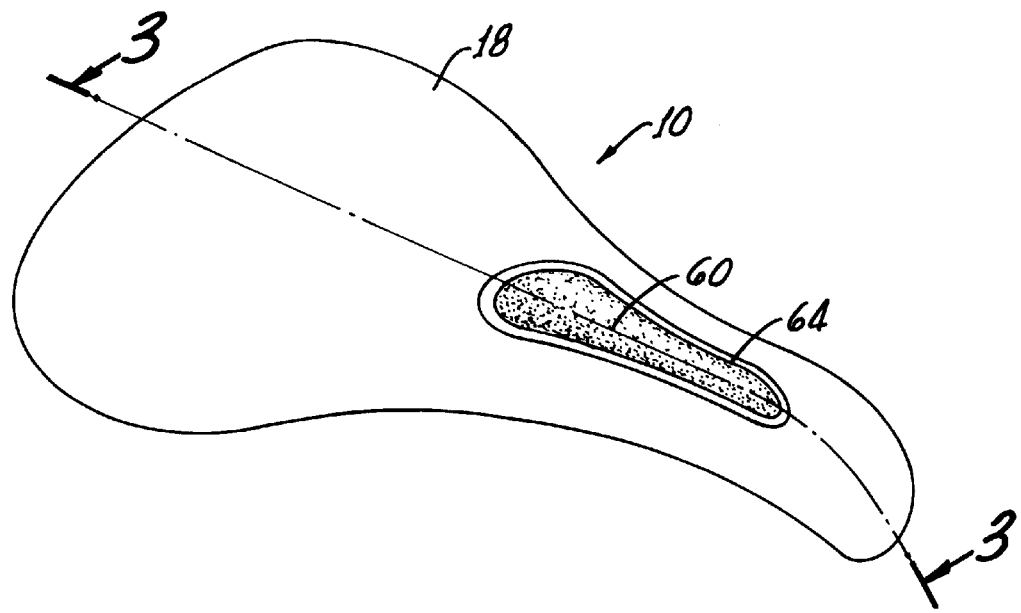
FIG. 1 is a perspective view of a bicycle saddle in accordance with the present invention.
Figure 2:
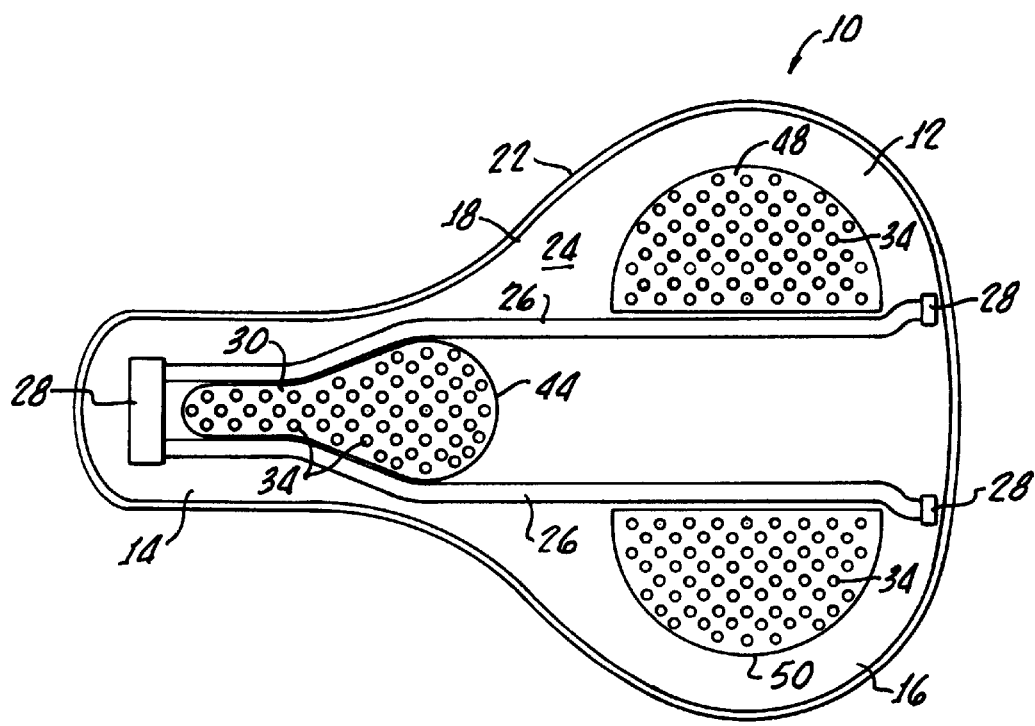
FIG. 2 is a plan bottom view of the bicycle saddle shown in FIG. 1 showing openings through the shell of the saddle and a honeycomb flexible shoe structure.

With reference to FIGS. 1 and 2, there is shown a bicycle saddle 10 in accordance with the present invention which includes a shell 12 (see FIG. 2) including a horn 14 and seat portion 16. A covering 18 is provided and attached to a perimeter 22 of the shell 12, preferably on an underside 24 thereof.

Rails 26, shown in FIG. 2, are attached to the shell underside 24 by way of molded berms 28, and provide a means for attaching the saddle 10 to a bicycle post (not shown).

The covering may be any suitable fabric or film, for example, the covering may comprise, but is not limited to, a four-way stretch fabric made of an elastomeric thread, such as a segmented polyester-polyurethane, like that sold under the trade name, Lycra®.

Figure 3:
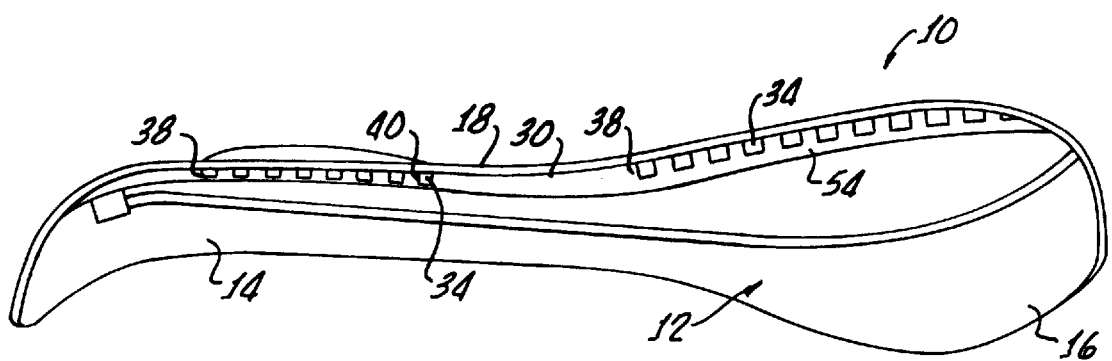
FIG. 3 is a cross sectional view taken along the line 3—3 of FIG. 1 showing the honeycomb structure of the flexible shoe over a seat opening and an engagement with projections from a resilient member disposed between the shell and the flexible shoe.
Figure 4:
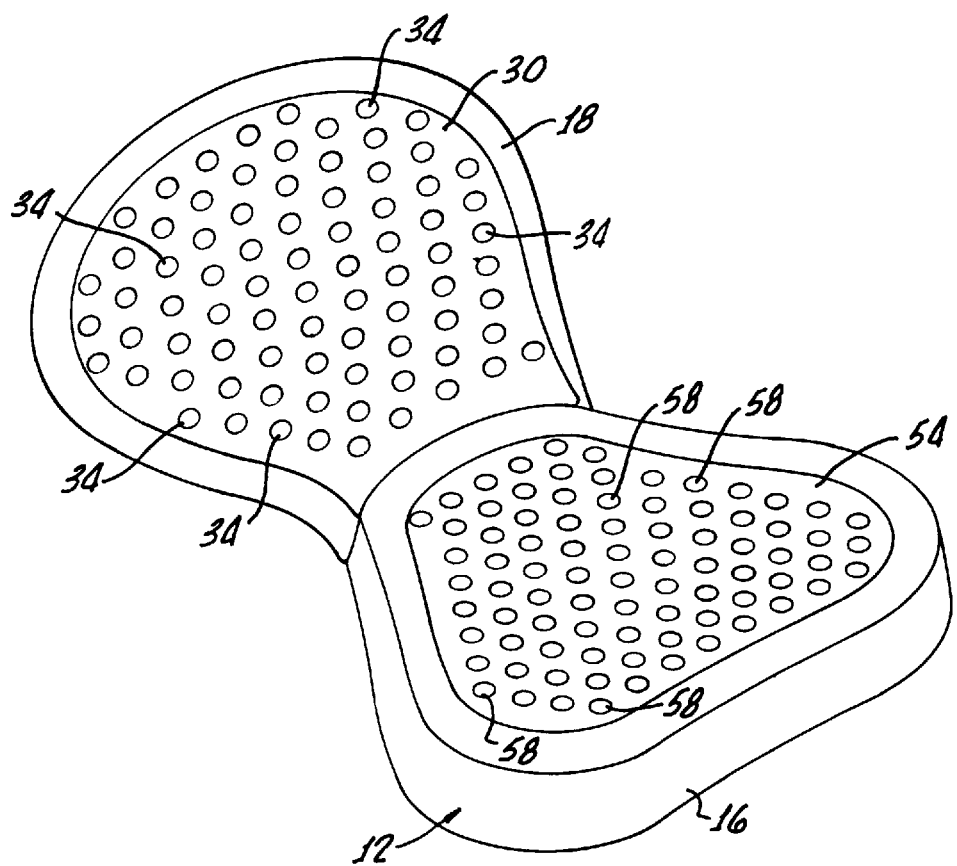
FIG. 4 is a perspective view of the saddle with the covering and flexible shoe attached thereto, being separated from the shell and resilient means in order to show the honeycomb structure of the flexible shoe, with cavities arranged and sized for engagement with mating projections from the resilient member.

A flexible shoe 30, shown in FIG. 3, is disposed between the shell 12 and the covering, or fabric, 18. The flexible shoe 30 may be formed from any suitable type of polymer, such as, for example, set forth in U.S. Pat. No. 5,633,286, which is incorporated into the present application by this specific reference thereto, for describing the types of polymer/elastomer suitable for the present invention. The term elastomer utilized throughout this application is meant to include all materials having elastomer properties, such as, but not limited to, gels and foams.

Importantly, the flexible shoe 30 may be attached, or formed onto, the covering 18, by way of molding or injection, such as set forth in U.S. patent application Ser. No. 09/148,447 entitled, BICYCLE SADDLE WITH ADJUSTABLE CUSHIONING. This application is to be incorporated herewith in its entirety for the purpose of describing the method in which the flexible shoe may be formed and applied to the covering 18.

Importantly, the flexible shoe 30 is formed with a honeycomb structure having a plurality of cavities 34. A seat portion 38 of the flexible shoe 30 may be thicker than a horn portion 40 in order to provide more resiliency over a horn opening 44 than over the shell seat 16 which may have openings 48, 50 in order to provide more resiliency over the horn opening 44 than over the seat opening 48, 50.

Alternatively, the seat openings 48, 50 may be eliminated, and a resilient member 54 disposed between the shell seat 16 and the flexible shoe 30. The resilient member 54 may be an elastomeric gel similar to the flexible shoe 30 or be of urethane foam or the like. It should be appreciated that the cavities 34 and projections 58 may be arranged and sized in order to provide more resiliency over the horn 14 than the seat 16.

Importantly, flexible member 54 is formed with projections 58 thereon and the cavities 34 and projections 58 are sized and spaced apart from one another to enable engagement therebetween upon assembly as is shown in FIG. 3. Thus, the combination of the flexible shoe 30 and the elastic member 54 modifies the resiliency of the saddle 10 over the seat shell 16. The projections 58 and cavities may be either in the resilient member 54 or the shoe 30. In fact, both projections 58 and cavities 34 may be present on each of the resilient member 54 and shoe 30 as long as they are arranged and spaced apart from one another to engage one another upon assembly of the saddle. The resilient member 54 and shoe 30 are separable from one another to enable change of resilient projections.

Because the shell horn portion 14 does not support the shoe 30 in the area of the opening 44, unrestricted resiliency is provided in this portion of the saddle 10, thus eliminating a "bottoming" effect, hereinabove described.

In addition, the honeycomb structure of the shoe 30 enables air passage therethrough in the area of the horn opening 44. In that regard, perforations 60 may be provided in the covering 16 if the covering is not inherently permeable.

Further, a plastic, such as a urethane, 64, may be coated or thermally impressed into the coating 18, in order to provide a moisture barrier.

Although there has been hereinabove described a particular arrangement of a bicycle saddle in accordance with the present invention for the purpose of illustrating the manner in which the invention may be used to advantage, it should be appreciated that the invention is not limited thereto. Accordingly, any and all modifications, variations or equivalent arrangements which may occur to those skilled in the art should be considered to be within the scope of the present invention as defined in the appended claims.

What is claimed is:

1. A bicycle saddle comprising:
   a bicycle saddle shell having an opening in a horn of the shell and an opening in a seat of the shell;
   a covering disposed on the shell and attached thereto;
   a flexible shoe disposed between the shell and the covering; and
   resilient means, disposed between the shell and the flexible shoe for providing more resiliency over the horn opening than over the seat opening.

2. The bicycle saddle according to claim 1 wherein said flexible shoe is an elastomer having a plurality of cavities therein and said resilient means includes a plurality of projections, the cavities and projections being sized and spaced apart from one another to enable engagement therebetween.

3. The bicycle saddle according to claim 2 wherein said flexible shoe is attached to said covering.

4. The bicycle saddle according to claim 3 wherein said resilient means is disposed between the shell and the flexible shoe in the saddle seat.

5. The bicycle saddle according to claim 2 wherein said resilient means comprises a foam.

6. The bicycle saddle according to claim 2 wherein said resilient means comprises an elastomer.

7. A bicycle saddle comprising:
   a bicycle saddle shell having a horn and a seat, said horn having an opening therein;
   a fabric disposed on the shell and sealed thereto;
   a flexible shoe disposed between the shell and the fabric, said flexible shoe providing more resiliency over the horn opening than over the seat; and
   resilient means, disposed between the shell and the flexible shoe, for providing resiliency over the seat.

8. The bicycle saddle according to claim 7 wherein said flexible shoe comprises an elastomer and said resilient means comprises a foam.

9. The bicycle saddle according to claim 8 wherein said flexible shoe includes a plurality of cavities therein and said resilient means includes a plurality of projections, the cavities and projections being sized and spaced apart from one another to enable engagement therebetween.

10. The bicycle saddle according to claim 7 wherein said flexible shoe comprises an elastomer and means, defining a honeycomb structure, for enabling air passage therethrough in a portion of the flexible shoe covering the horn opening.

11. The bicycle saddle according to claim 10 further comprising means, defining perforation in said fabric, for enabling air passage therethrough in a portion of the fabric covering the horn opening.

12. The bicycle saddle according to claim 11 further comprising a plastic coating means, disposed on the portion of fabric covering the horn opening, for providing a moisture barrier.

13. A bicycle saddle comprising:
   a bicycle saddle shell having a horn and a seat;
   resilient means disposed on the shell, for providing resiliency to the saddle, the resilient means including a plurality of projections;
   a resilient flexible shoe disposed over said resilient means, the shoe having a plurality of cavities therein, the cavities and projections being sized and spaced apart from one another to enable engagement therebetween.

14. The bicycle saddle according to claim 13 further comprising a covering disposed over the flexible shoe.

15. The bicycle saddle according to claim 14 wherein the cavities and projections are arranged and sized to provide more resiliency over the horn than over the seat of the shell.

16. The bicycle saddle according to claim 14 wherein the flexible shoe is attached to said covering and the resilient means is attached to the shell, the flexible shoe and resilient means being separable from one another.

17. A bicycle saddle comprising:
   a bicycle saddle shell having a horn and a seat;
   resilient means disposed on the shell, for providing resiliency to the saddle, the resilient means including a plurality of cavities;
   a resilient flexible shoe disposed over said resilient means, the shoe having a plurality of projections therein, the cavities and projections being sized and spaced apart from one another to enable engagement therebetween.

18. The bicycle saddle according to claim 17 further comprising a covering disposed over the flexible shoe.

19. The bicycle saddle according to claim 18 wherein the cavities and projections are arranged and sized to provide more resiliency over the horn than over the seat of the shell.

20. The bicycle saddle according to claim 18 wherein the flexible shoe is attached to said covering and the resilient means is attached to the shell, the resilient means and resilient flexible shoe being separable from one another.

* * * * *